(12) United States Patent
Lin et al.

(10) Patent No.: US 10,776,626 B1
(45) Date of Patent: Sep. 15, 2020

(54) MACHINE LEARNING BASED IDENTIFICATION OF VISUALLY COMPLEMENTARY ITEM COLLECTIONS

(71) Applicant: Amazon Technologies, Inc., Seattle, WA (US)

(72) Inventors: Qiuying Lin, Seattle, WA (US); Brian Mann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 15/979,064

(22) Filed: May 14, 2018

(51) Int. Cl.
G06K 9/00 (2006.01)
G06K 9/62 (2006.01)
G06N 3/04 (2006.01)
G06N 20/00 (2019.01)
G06F 16/583 (2019.01)

(52) U.S. Cl.
CPC ....... *G06K 9/00677* (2013.01); *G06F 16/583* (2019.01); *G06K 9/6212* (2013.01); *G06N 3/04* (2013.01); *G06N 20/00* (2019.01)

(58) Field of Classification Search
CPC ........ G06N 3/04; G06N 20/00; G06F 16/583; G06K 9/00677; G06K 9/6212
See application file for complete search history.

(56) References Cited

U.S. PATENT DOCUMENTS

| | | | | |
|---|---|---|---|---|
| 10,043,109 B1* | 8/2018 | Du | ................. | G06N 3/0454 |
| 10,176,198 B1* | 1/2019 | Dhua | ................. | G06F 17/30247 |
| 10,540,757 B1* | 1/2020 | Bouhnik | ................. | G06T 3/0068 |
| 10,621,779 B1* | 4/2020 | Topiwala | ................. | G06N 3/08 |
| 2008/0235114 A1* | 9/2008 | Wannier | ................. | G06Q 30/0631 705/26.7 |
| 2015/0161674 A1* | 6/2015 | Khoury | ................. | G06Q 30/0601 705/14.66 |
| 2015/0378999 A1* | 12/2015 | Dorner | ................. | G06F 16/5838 707/745 |
| 2015/0379000 A1* | 12/2015 | Haitani | ................. | G06F 16/58 707/745 |
| 2015/0379002 A1* | 12/2015 | Dorner | ................. | G06F 16/54 707/745 |

(Continued)

OTHER PUBLICATIONS

Gu et al. "Fashion coordinates recommendation based on user behavior and visual clothing style." Proceedings of the 3rd International Conference on Communication and Information Processing. 2017. (Year: 2017).*

(Continued)

*Primary Examiner* — Katrina R Fujita
(74) *Attorney, Agent, or Firm* — Knobbe, Martens, Olson & Bear, LLP

(57) ABSTRACT

Aspects of the present disclosure relate to machine learning techniques for identifying collections of items that are visually complementary. These techniques can relying on computer vision and item imagery. For example, a first portion of a machine learning system can be trained to extract aesthetic item qualities from pixel values of images of the items. A second portion of the machine learning system can learn correlations between these extracted aesthetic qualities and the level of visual coordination between items. Thus, the disclosed techniques use computer vision machine learning to programmatically determine whether items visually coordinate with one another based on pixel values of images of those items.

24 Claims, 10 Drawing Sheets

(56) References Cited

U.S. PATENT DOCUMENTS

| | | | | |
|---|---|---|---|---|
| 2015/0379003 | A1* | 12/2015 | Dorner | G06F 16/54 707/772 |
| 2015/0379004 | A1* | 12/2015 | Sayre | G06F 16/54 707/772 |
| 2015/0379005 | A1* | 12/2015 | Dorner | G06F 16/58 707/772 |
| 2016/0026926 | A1* | 1/2016 | Yeung | G06Q 30/0269 706/12 |
| 2017/0046769 | A1* | 2/2017 | Jackson | G06Q 30/0631 |
| 2017/0323319 | A1* | 11/2017 | Rattner | G06Q 30/0611 |
| 2019/0164340 | A1* | 5/2019 | Pejic | G06T 7/543 |
| 2019/0318405 | A1* | 10/2019 | Hu | G06K 9/6274 |

OTHER PUBLICATIONS

Li et al. "Mining fashion outfit composition using an end-to-end deep learning approach on set data." IEEE Transactions on Multimedia 19.8 (2017): 1946-1955. (Year: 2017).*

Tangseng et al. "Looking at outfit to parse clothing." arXiv preprint arXiv:1703.01386 (2017). (Year: 2017).*

Veit et al. "Learning visual clothing style with heterogeneous dyadic co-occurrences." Proceedings of the IEEE International Conference on Computer Vision. 2015. (Year: 2015).*

Chen et al. "Magic decorator: automatic material suggestion for indoor digital scenes." ACM Transactions on graphics (TOG) 34.6 (2015): 1-11. (Year: 2015).*

Guan et al. "Enhancing apparel data based on fashion theory for developing a novel apparel style recommendation system." World Conference on Information Systems and Technologies. Springer, Cham, Mar. 2018. (Year: 2018).*

Hu et al. "Visual classification of furniture styles." ACM Transactions on Intelligent Systems and Technology (TIST) 8.5 (Jun. 2017): 1-20. (Year: 2017).*

Kolstad et al. "Rethinking Conventional Collaborative Filtering for Recommending Daily Fashion Outfits." RecSysKTL. Aug. 2017. (Year: 2017).*

Liu et al. "Hi, magic closet, tell me what to wear!." Proceedings of the 20th ACM international conference on Multimedia. 2012. (Year: 2012).*

Liu et al. "Style compatibility for 3D furniture models." ACM Transactions on Graphics (TOG) 34.4 (2015): 1-9. (Year: 2015).*

Pan et al. "Deep model style: Cross-class style compatibility for 3D furniture within a scene." 2017 IEEE International Conference on Big Data (Big Data). IEEE, Dec. 2017. (Year: 2017).*

Tautkute et al. "What looks good with my sofa: Multimodal search engine for interior design." 2017 Federated Conference on Computer Science and Information Systems (FedCSIS). IEEE, Sep. 2017. (Year: 2017).*

Vuruskan et al. "Intelligent fashion styling using genetic search and neural classification." International Journal of Clothing Science and Technology (2015). (Year: 2015).*

Yu et al. "DressUp!: outfit synthesis through automatic optimization." ACM Trans. Graph. 31.6 (2012): 134-1. (Year: 2012).*

Zhang et al. "Trip outfits advisor: Location-oriented clothing recommendation." IEEE Transactions on Multimedia 19.11 (Nov. 2017): 2533-2544. (Year: 2017).*

Zhang et al. "Real-time clothes comparison based on multi-view vision." 2008 Second ACM/IEEE International Conference on Distributed Smart Cameras. IEEE, 2008. (Year: 2008).*

Zhang et al. "Apparel silhouette attributes recognition." 2012 IEEE Workshop on the Applications of Computer Vision (WACV). IEEE, 2012. (Year: 2012).*

Goodfellow et al. Generative adversarial nets. NIPS, pp. 2672-2680, 2014.

Goodfellow, et al. Deep Learning. MIT Press, 2016. http://www.deeplearningbook.org.

Han et al. Learning fashion compatability with bidirectional LSTMs. ACM Multimedia, 2017.

Hastie, et al. The Elements of Statistical Learning. Springer Series in Statistics. Springer New York Inc., New York, NY, USA, 2001.

He et al. Learning compatibility across categories for heterogeneous item recommendation. In IEEE 16th International Conference on Data Mining, ICDM, pp. 937-942, 2016.

http://launchpadacademy.in/principles-interior design/. 7 principles of interior design that every designer must know! (2015).

Karras et al. Progressive growing of GANs for improved quality, stability, and variation. CoRR, 2017. abs/1710.10196.

Knight, Amazon has developed an AI fashion designer, MIT Technology Review (Aug. 24, 2017), https://www.technologyreview.com/s/608668/amazon-has-developed-an-ai-fashion-designer/.

Koren et al. Advances in collaborative filtering. Recommender System Handbook, pp. 145-186, 2011.

Lin, et al, Microsoft COCO: Common Objects in Context, 2015. arXiv:1405.0312.

Linden, et al, Amazon.com recommendations: item-to-item collaborative filtering. IEEE Internet 253 Computing, Jan./Feb. 2003. vol. 7, Issue: 1.

Lu et al. Conditional CycleGAN for attribute guided face image generation. CoRR, 2017. abs/1705.09966.

McAuley et al. Image-based recommendations on styles and substitutes. In SIGIR, 2015.

Melville et al. Content-boosted collaborative filtering for improved recommendations. In Eighteenth National Conference on Artificial Intelligence, pp. 187-192, 2002.

Russakovsky et al. Imagenet large scale visual recognition challenge. In IJCV, 2015.

Szegedy et al. Rethinking the inception architecture for computer vision. arXiv:1512.00567, 2015.

Zhao et al. Pyramid scene parsing network. In CVPR, 2017.

Zhou et al. Scene parsing through ADE20K dataset. In CVPR, 2017.

Zhou et al. Semantic understanding of scenes through ADE20K dataset. arXiv:1608.05442, 2017.

* cited by examiner

MACHINE LEARNING BASED IDENTIFICATION OF VISUALLY COMPLEMENTARY ITEM COLLECTIONS

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF THE DRAWINGS

Specific embodiments and inventive features will now be described with reference to the drawings, which are provided for purposes of illustration, and not limitation. Throughout the drawings, reference numbers may be re-used to indicate correspondence between referenced elements. Although certain ones of the drawings depict grayscale images, the original color present in these images is addressed in certain portions of the description.

DETAILED DESCRIPTION

Figure 1A:
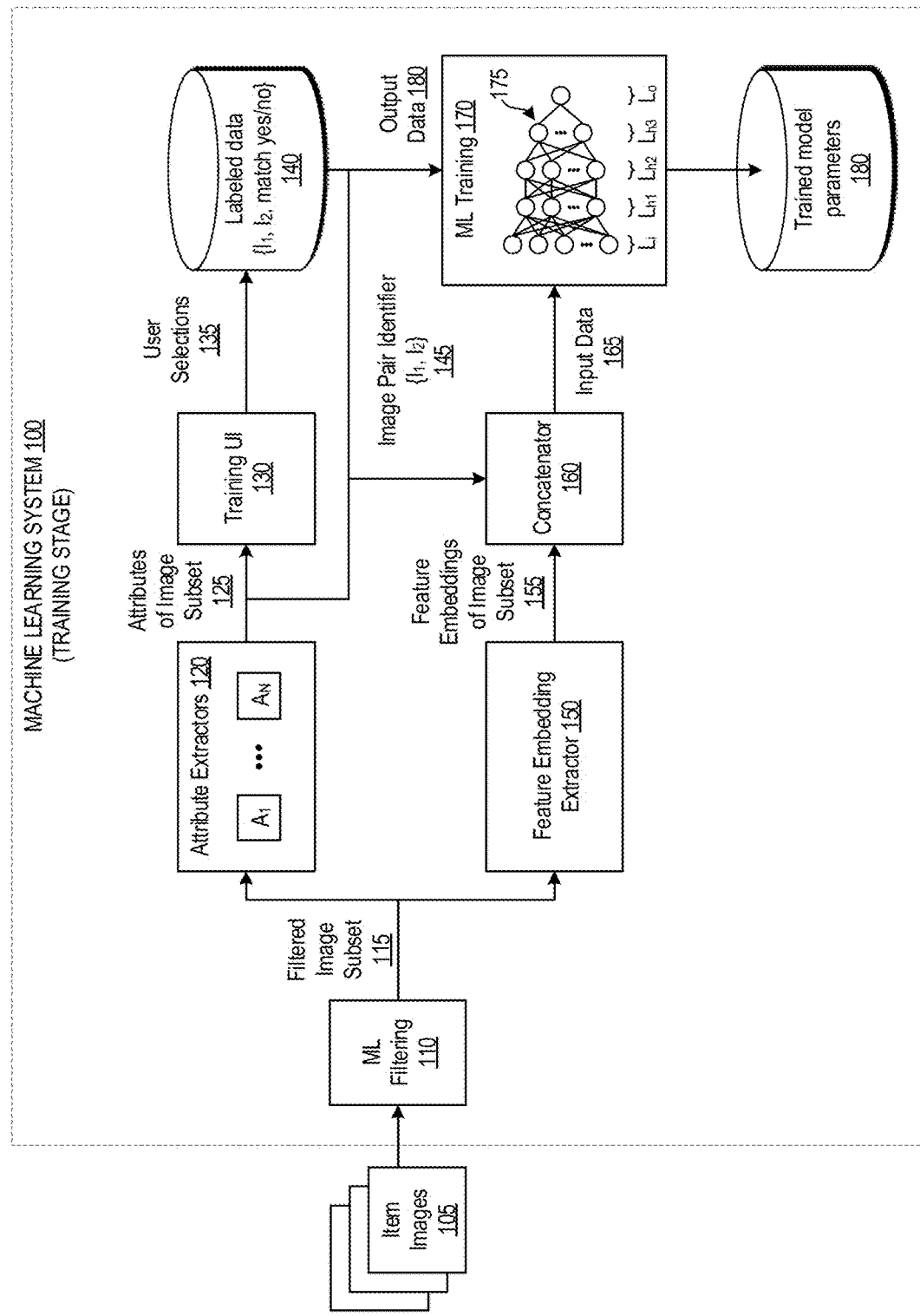
FIG. 1A illustrates a block diagram of training the disclosed machine learning system to recommend visually complementary sets of items.

The present disclosure is generally directed to using artificial intelligence or machine learning systems to build and use computer models for identifying collections of items that are visually pleasing when grouped together. Such computer models may begin with a base item, for example a sofa, and identify a collection of aesthetically complementary items that match with the base item, for example a chair, a rug, a lamp, and a coffee table. Humans perceive particular stylistic attributes as either conflicting or complementing one another. However, computer systems are commonly understood to not perceive or appreciate beauty or aesthetics, and so using them to try to predict sets of items that visually complement one another requires extraction of meaningful patterns from gathered data. The disclosed machine learning techniques generate a human-made algorithm that represents such extracted patterns and enables computers to identify visually complementary items (e.g., items that are aesthetically pleasing when viewed together).

The disclosed machine learning techniques can be useful in the context of curating furniture collections, among other contexts for various types of collections of visually complementary items. Traditionally, furniture collections are professionally curated by interior designers. However, many shoppers (including users of electronic commerce ("e-commerce") sites) do not have a personal interior designer to help them select home furnishings. Further, electronic catalogs typically focus on providing information for users to evaluate a single item, and do not help users select other items that are visually complementary with that single item. For example, a user viewing a detail page of a sofa would not be presented with recommendations across a set of other categories that represent a full room of visually complementary items such as coffee tables, rugs, lamps, and wall art. Any cross-category recommendations are usually based on an analysis of prior purchase histories of users, e.g., "people who bought this also bought or viewed this". Even then, the recommendations are based on item-to-item associations, and not particular characteristics of the visual appearance of items that yield visual coordination. This confers an advantage to brick and mortar stores, where a designer or representative can suggest complementary items to pair with one another, or where staged furniture displays provide shoppers with cues regarding available visually complementary items. For users of electronic catalogs, it can be very time consuming to find every matching piece for a particular furniture item, and then select from among those matching pieces.

Standard machine learning approaches to product recommendation are typically based on user purchase history, view history, or item ratings, and include techniques such as collaborative filtering. However, in settings where visual features are key to user buying decisions (such as with clothing or home furnishings), the traditional methods may not give the best recommendations, or may fall short of an approach that takes into account the user's visual preferences. Furthermore, traditional approaches are stymied because users rarely purchase entire sets of complementary items at the same time, and may view many different options before selecting the item they wish to purchase.

The above-described challenges, among others, are addressed in some embodiments by the disclosed machine learning techniques for identifying collections of items that are visually complementary by relying on computer vision and item imagery. Specifically, a first portion of the machine learning system can be trained to extract aesthetic item qualities from pixel values of images of the items. A second portion of the machine learning system can learn correlations between these extracted aesthetic qualities and the level of visual coordination between items. Thus, the disclosed techniques use computer vision based machine learning to programmatically determine whether items visually coordinate with one another based on pixel values of images of those items. The disclosed techniques can be used to recommend entire sets or collections of items, for example home furnishings, that are complementary to an item (or items) that a user is viewing, has already purchased, etc. The examples presented herein focus on the context of a "complete the room" set for a living room, including items across eight different categories: sofa, chair, coffee table, end table, rug, table lamp, floor lamp, and wall art. However, the disclosed techniques can be used to generate visually complementary collections across other categories for a living room, for other rooms or spaces (e.g., office, patio, bedroom), and for other types of visually coordinated items (e.g., apparel, landscaping, art collections). This provides a solution to the problem of choosing complementary furniture items (or other types of items) by building a supervised machine learning model that inherently mimics a stylist (e.g., an interior designer, fashion stylist, landscape professional, art curator, or other professionals that can recommend visually complementary sets of items). Thus, the disclosed trained machine learning models can be considered as an artificially intelligent stylist.

In some implementations, the supervised training process can be facilitated through the usage of additional machine learning models. For example, an electronic catalog can have hundreds, thousands, or millions of different items in each category. However, whether or not these items match (e.g., visually coordinate) with one another requires labeling by a human in order to teach the disclosed machine learning models how to recognize which items match. In machine learning, labeling refers to establishing the "ground truth" for a particular piece of data, for example in this context whether or not two images depict visually complementary items. It can require an infeasible amount of time for a human stylist to manually sort through massive sets of item images to identify matches with a source item. As such, aspects of the present disclosure relate to using additional machine learning models to reduce the volume of items for review by the stylist by around 40% (or less or more, depending upon the implementation). These additional machine learning models can extract salient features from images of the items and use these features to filter out items that are unlikely to match the source item. Beneficially, this reduces the amount of time required from the human stylist for labeling data that is then used to train the artificially intelligent stylist.

The task of navigating a large electronic catalog of items (e.g., a catalog with over one thousand, over ten thousand, or over one hundred thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

As would be appreciated by one of skill in the art, the use of the disclosed machine learning techniques represents a significant technological advance over prior implementations. Specifically, the use of the feature extraction machine learning models enables the creation of user interfaces that enable human stylists to identify matching item pairs for generating labeled training data with fewer clicks, scrolls, and/or page navigations that would otherwise be required to assess items for matches to a source item. In addition, the use of the artificially intelligent stylist confers new abilities to computer systems, namely the ability to automatically distinguish between visually complementary (matching) and visually conflicting (non-matching) items. Further, recommendation collection user interfaces generated using the artificially intelligent stylist enable users to locate visually complementary collections of items more quickly than they are able to using current user interfaces. For example, in the embodiments described herein, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult. Another benefit of the disclosed user interface for presenting item collections is that it allows the user to see the set of two or more items on the same page, for example side-by-side or grouped together. This makes it easier for the user to visualize the items in a room (or other type of collection) together, and for the user to determine that the items are in fact visually complementary. The user would otherwise typically have to toggle between different pages, or arrange the pages side by side on their screen, to perform this visual comparison task. As such, the embodiments described herein represent significant improvements in computer-related technology.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

The present disclosure presents examples in the context of home furnishings. It will be appreciated that implementations of the disclosed artificially intelligent stylist can be used to recommend visually complementary collections of other types of items, for example apparel, landscaping materials, art collections, and other types of items that preferably visually coordinate. Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting.

Overview of Example Machine Learning System

FIG. 1A illustrates a block diagram of training the disclosed machine learning system 100 to recommend visually complementary sets of items. The machine learning system 100 includes a machine learning filtering module 110, A1-An attribute extractors 120, a training user interface manager 130, a repository of labeled data 140, a feature embedding extractor 150, a concatenator 160, a machine learning training module 170, the artificially intelligent ("AI") stylist model 175, and a data repository 180 storing the parameters of the trained AI stylist model 175.

The machine learning system 100 is input with item images 105. Item images 105 depict different items, for example products or services available in an electronic marketplace. The item images 105 may have associated metadata, for example indicating a type or category of the item depicted by the image.

The machine learning filtering module 110 can include one or more machine learning models trained to clean the dataset of the item images 105. For example, one model can be trained to identify blurry images of the item images 105, where blurry images may have a value for a sharpness metric (e.g., spatial frequency response, modulation transfer function, contrast) above or below a threshold. The filtering module 110 can remove identified blurry images from the data set. Another model can be trained to identify items of a specific type or types based on pixel values in the image data, and can compare the determined type of item depicted in an image with the metadata associated with that image. If the determined type and the type indicated in the metadata do not match, the filtering module 110 can remove that image from the data set. Beneficially, using the filtering module 110 to clean the item images 105 data set can reduce the volume of images for consideration during training, and can also remove images that are unlikely to increase accuracy of the AI stylist model 175.

The resulting filtered image subset 115 can be provided to both the attribute extractors 120 and the feature embedding extractor 150. In some implementations, the filtered image subset 115 can first be provided to the attribute extractors 120 for identifying and using image attributes to guide the training data labeling process, and any images later used for training can be provided to the feature embedding extractor 150.

The attribute extractors A1-An 120 can each analyze each image in the filtered image subset 110 to identify how a particular attribute appears in the image. These attributes can be a pre-selected set of visual attributes that are relevant to a particular type of item collection, and stylists can label a number of images (e.g., 1,000-2,000 in some implementations) with values for these attributes for use in training the attribute extractors. While certain item attributes (e.g., category, price, brand) may be included in catalog data describing the items, the attributes of the attribute extractors A1-An 120 are not represented in such catalog data and instead relate to the overall look and feel of the items themselves. Individual ones of the attribute extractors 120 can be implemented as convolutional neural networks that take image pixel values as input, forward propagate those values through a number of convolutional (and optionally fully connected) layers, and then generates an output that categorizes the image as one of a number of options for that attribute. Other suitable attribute extractors 120 include support vector machines and logistic regression. These outputs can be converted into a numeric representation suitable for input into a neural network via a one-hot encoder, for example. One hot encoding is a process by which categorical variables are converted into a form (for example, a vector) that can be provided as input into a machine learning algorithm.

The pre-selected set of attributes may represent, for example, factors that influence a stylist's decision to pair (or not) two or more items into a visually complementary collection. Specific examples of attributes and options are described in further detail with respect to FIG. 1C. However, in addition to these attributes, expert stylists can consider many factors and feelings that are not as easily described. As such, the disclosed techniques can additionally generate a feature embedding representing a particular image for use by the AI stylist model 175. In machine learning, feature learning allows a system to automatically discover the representations needed for feature detection or classification from raw data. This replaces manual feature engineering and allows a machine to both learn the features and use them to perform a specific task. The feature embedding extractor 150 can extract these feature embeddings of the images. The feature embedding extractor 150 can be a convolutional neural network, for example the Inception V3 network pre-trained on ImageNet to extract embeddings in $R^{2048}$. The Inception V3 network (described in Szegedy, et. al. "Rethinking the Inception Architecture for Computer Vision", available at https://arxiv.org/abs/1512.00567) is one example of a deep convolutional neural network that can be used to extract a representation of the features in an image, and other convolutional neural networks (pre-trained or trained on the image data 105, for example in an end-to-end fashion with the AI stylist network 175) can also perform suitably as the feature embedding extractor 150. Generally, convolutional neural networks have stacked convolutional layers (optionally followed by contrast normalization and maxpooling), followed by one or more fully connected layers (described below in more detail with respect to the AI stylist model 175). The Inception network expands on this architecture with the use of "inception modules" that learns, during training, which size convolutional filter to apply to a given set of computations within the network.

The attribute extractors 120 can provide the attributes 120 of the filtered image subset 110 to the training user interface manager 130. As described in more detail with respect to FIGS. 3 and 4, the training user interface manager 130 can use the identified attributes to reduce the volume of images presented to a human stylist for labeling. Specifically, an image of a particular item may be presented as a "source item" that is the base for generating a collection of visually complementary items. The labeling process can request that the human stylist select images of items, from different categories than the source item, that visually complement the source item. The human stylist can browse through images of items in each category to select matches for the source item. As described above, the large volume of items in each category may make this process very time consuming. The attribute extractors 120 and training user interface manager 130 cooperate to reduce this time burden on the stylist. For example, the training user interface manager 130 can filter the items in the other categories to only display items with attribute values that match or complement the source item.

To illustrate, consider the attribute of style. The style of each can be automatically extracted by one of the attribute extractors 120, for example a convolutional neural network trained to classify images according to a pre-defined set of styles (e.g., modern, contemporary, French country). When a source item is selected, the training user interface manager 130 can use pre-defined style matching rules to identify images depicting items with styles that coordinate with the source item. Such style matching rules can be input by a user (such as a stylist) or can be learned, for example by analyzing style distributions in images of curated collections of items (e.g., curated furniture collections, curated apparel ensembles). Only images that depict items of styles that coordinate with the style of the source item can be shown to the stylist during the match selection process. In some implementations, this may involve filtering out any image classified as a different style than the source item's image. This attribute-based filtering can be performed across one or more attributes based on attribute-specific coordination rules, and can significantly reduce the volume of images displayed during the match selection process.

During the match selection process, the training user interface manager 130 can display an image of a source item and prompt the user to select, from among a number of other displayed images, items from a different category than the source item that are visually complementary to the source item. This prompt may request a certain number of selections, or any matching selections. The training user interface manager 130 can monitor the selections of the user of certain images as matching other images, and can store these as labeled data in tuple form as a pairwise match {$I_1$, $I_2$, match}, with $I_1$ representing the source item image and $I_1$ representing a selected matching image. These are referred to as positive cases in the training data. Some or all non-selected images can be stored in tuple form as pairwise non-matches {$I_1$, $I_3$, no match}, with $I_1$ representing the source item image and $I_3$ representing a non-selected image. These are referred to as negative cases in the training data. Model performance may be improved by training with equal numbers of positive and negative cases.

In order to generate a suitable input for the AI stylist model 175, the labeled data repository 170 can provide an image pair identifier 145 to the concatenator 160. This image pair identifies two images that have been labeled as matching or non-matching. The concatenator 160 also receives a numerical representation of the attributes of the images in this pair from the attribute extractors 120, and receives a feature embedding 155 of each image from the feature embedding extractor 150. The attributes used to generate the input may be all or some of the attributes extracted for use by the training user interface manager 130. The concatenator 160 concatenates the attributes and feature vectors of each of the images into a single vector for input into the AI stylist model 175.

The AI stylist model 175 can be an artificial neural network. Such artificial neural networks are used to model complex relationships between inputs and outputs and to find patterns in data, where the dependency between the inputs and the outputs cannot be easily ascertained. The neural network includes input layer $L_i$, three hidden layers $L_{h1}$, $L_{h2}$, $L_{h3}$, and an output layer $L_o$, with each layer including a number of nodes. The number of nodes 15 can vary between layers. The input layer $L_i$ can have as many nodes as needed to intake the concatenated feature vector. In one implementation, the first hidden layer $L_{h1}$ has 64 nodes, the second hidden layer $L_{h2}$ has 64 nodes, and the third hidden layer $L_{h3}$ has 10 nodes. The output layer $L_o$ is depicted with a single node, which can output a score reflecting the probability or likelihood that the two images represented by the input data match with one another (e.g., probability of positive classification). It will be appreciated that in other implementations the number of layers (and nodes per hidden layer) can vary. For example, the AI stylist model 175 can be considered as a binary classification model, and thus the output layer can also be structured with two node (e.g., one for "matching" and one for "not matching").

In one example the neural network is a fully connected neural network, that is, each node in the input layer $L_i$ is connected to each node in the first hidden layer $L_{h1}$, each node in the first hidden layer $L_{h1}$ is connected in turn to each node in the second hidden layer $L_{h2}$, each node in the second hidden layer $L_{h2}$ is connected in turn to each node in the third hidden layer $L_{h3}$, and each node in the third hidden layer $L_{h3}$ is connected the node in the output layer $L_o$. Other implementations may have varying connection structures.

The weights of these connections are learnt from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights (e.g., parameters) of the hidden layers can be considered as an encoding of meaningful patterns in the data. The nodes can multiply outputs from connected nodes by learned weights, sum the weighted inputs, and use an activation function to output a value (e.g., rectified linear unit (ReLU), sigmoid, hyperbolic tangent, leaky ReLU).

The machine learning training module 170 implements this training process on the AI stylist model 175 using the labeled training data. In one implementation, the AI stylist model 175 learns a function $f: P \rightarrow [0, 1]$ on pairs from stylist-generated collections defined by $f(x_i, x_j) = P(s_{ij}=1 | x_i, x_j)$ where $$s_{ij} = \begin{cases} 1 & x_i \text{ and } x_j \text{ are complementary} \\ 0 & \text{otherwise} \end{cases}$$

Thus, even though the trained AI stylist model 180 can be used to generate collections of items (which could include two, five, ten, or more items), the model is trained using pairwise matching or non-matching indications.

In one implementation, the AI stylist model 175 described above can be trained using batch normalization and a binary output (e.g., either matching or not matching) with cross-entropy loss. The model may be trained for 50 epochs using stochastic gradient descent. In some experiments, validation accuracy was 99%. In another implementation, a different AI stylist model 175 can be trained using only the embeddings (not one-hot encoded key attributes), by training a linear transformation of a target space so that items in the target space are close if they are complementary, and far apart if not. This approach can be considered as a shallow neural network with a nonstandard loss function. In some experiments, validation accuracy for this network was 85%. When training is complete, the model parameters (e.g., the learned weights) can be stored in the data repository 180 for the trained model. The trained model is thus referred to herein as the trained AI stylist model 180.

Figure 1B:
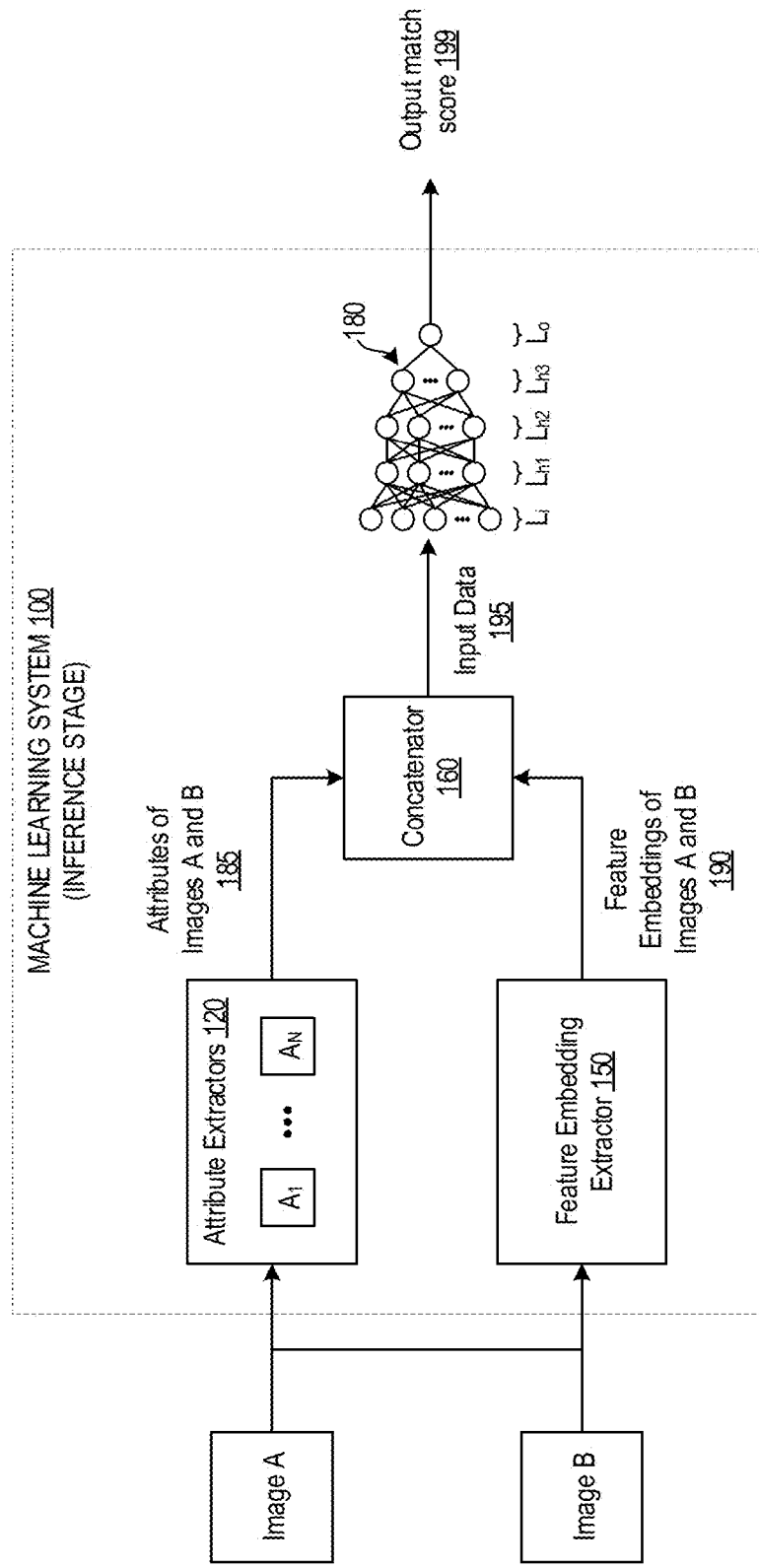
FIG. 1B illustrates a block diagram of using the machine learning system, trained according to FIG. 1A, to predict whether two images depict matching items.

FIG. 1B illustrates a block diagram of using the machine learning system 100, trained according to FIG. 1A, to predict whether two images depict matching items. As illustrated, two input images (image A and image B) are each provided to the attribute extractors 120 and feature embedding extractor 150. In some implementations, image A and image B may have been part of the training data set, and the extracted attributes and feature vectors may be stored and retrieved during use of the trained system, rather than being re-generated. In other implementations, the model can be structured to analyze a collection of three or more items by having a concatenated input representing the extracted features of each of the three or more items. The training data can be labeled as matching or non-matching collections of these three or more items.

The attributes 185 of images A and B and their feature embeddings 190 are provided to the concatenator 160. The attributes may be all or some of the attributes extracted for use by the training user interface manager 130. As described above, the concatenator concatenates one-hot encoded representations of the attributes 185 ("attribute encodings") and the feature embeddings 190 into a single vector (or other suitable numerical representation) for input into the trained AI stylist model 180. The input data 195, which represents the attributes and features extracted from the pixel values of images A and B, is forward passed through the trained AI stylist model 180 to generate an output match score 199. In one example, the input data 195 can be structured as follows: a first portion including the feature embedding of the first image concatenated with attribute encodings for a number of attributes of the first image, and a second portion including the feature embedding of the second image concatenated with attribute encodings for the same number of attributes of the second image, with these first and second portions concatenated together. The output match score 199 that can represent a probability that the items depicted in images A and B are visually complementary, for example a value between 0 (not matching) and 1 (matching).

The present disclosure refers to matching items that are visually complementary, or visually appealing when viewed together. As will be appreciated, the standard for this may vary from individual to individual, region to region, and time to time. For example, in the mid 1908's a prevailing trend was for every item in a furniture collection to match in manufacturer or brand, yielding a visually uniform look. Recent trends in interior design focus on variety and "fun" aesthetics, treating collections like art. Often, assembling these collections relies upon seven principles of interior design: unity, balance rhythm, emphasis, contrast, scale, and proportion. However, these terms are somewhat abstract concepts that can be difficult to translate into something that a computer can learn. Furthermore, designers often apply several rules when building collections—for example, a bulky sofa usually won't match with bulky chair, instead it matches better with non-bulky chair. There is also room for designers to break these rules for some pairs of items, as long as the overall look of the room is still appealing. Furthermore, some matching decisions are not easily summarized as rules, but more on overall visual feeling.

The disclosed techniques overcome these challenges by using separate attribute extractors 120 $A_1$-$A_n$ for several key attributes of the visual design of items. For furniture collections, these include style, material, mass, formality, line, tufted or not, and color. These key attributes represent the basic building blocks that interior designers use when considering the seven principles listed above, but in a manner that can be understood by computer systems. Each attribute extractor can be trained to extract a particular value for one of these attributes (style, material, mass, formality, line, tufted or not, and color) from the pixel values in image data. This provides an understanding to the computer system regarding the aesthetic qualities of the image, which are then correlated based on the labeling provided by the stylist during the training process.

Figure 1C:
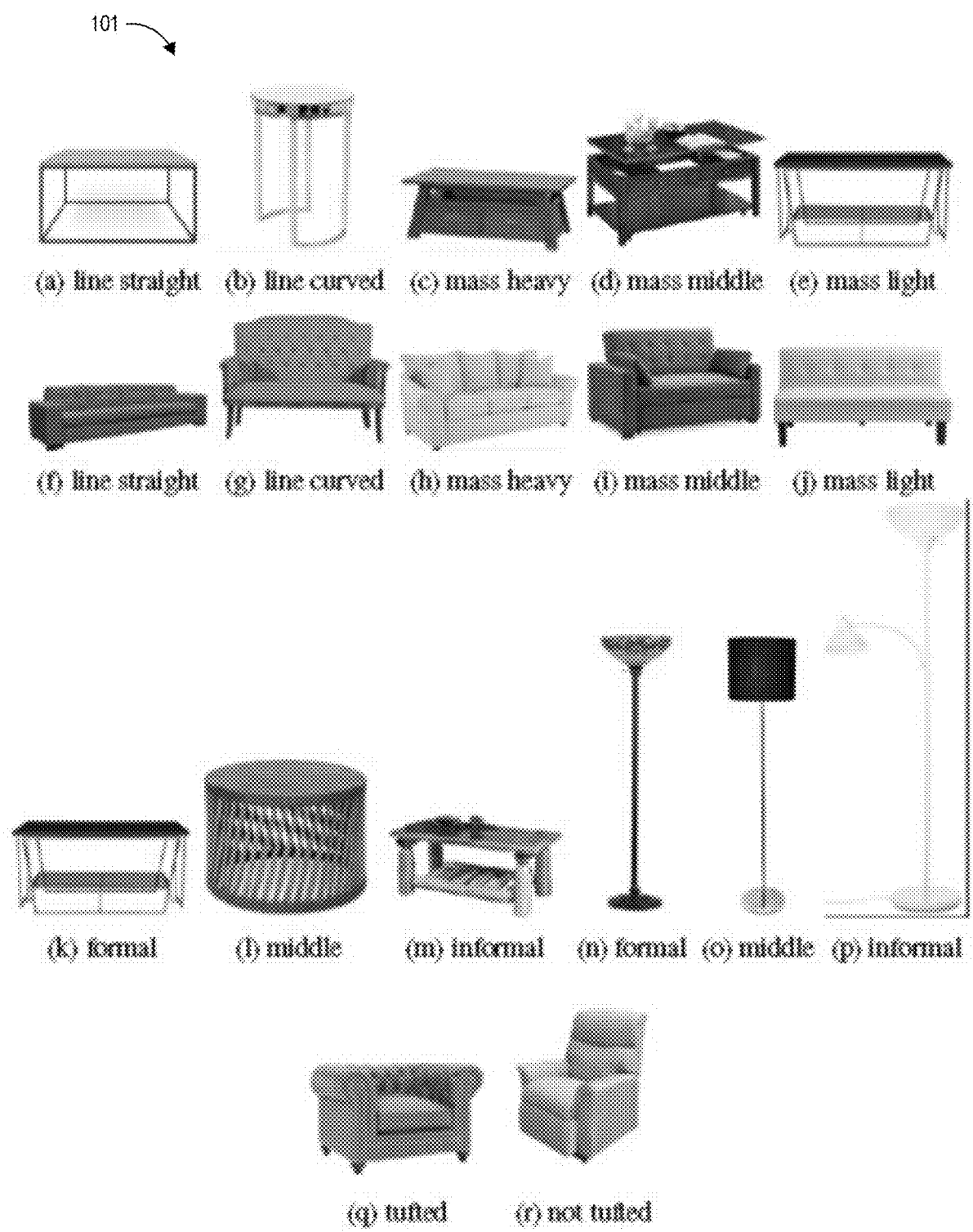
FIG. 1C depicts example item attributes that can be extracted by the attribute extractors of FIGS. 1A and 1B.

As used herein, item attributes refer to visual/aesthetic features of the item that are relevant to determining whether it visually coordinates with another item. Such features can be selected, for example, based on input from a stylist assisting with training the machine learning system 100. FIG. 1C provides a visual depiction of certain examples 101 of such item attributes that can be extracted by the attribute extractors 120. For example, item images (a) and (f) in FIG. 1C are analyzed by a "line" attribute extractor to have a value of "straight" for the "line" attribute, while item images (b) and (g) depict items are analyzed by the "line" attribute extractor to have a value of "curved" for the "line" attribute. Item images (c) and (h) are analyzed by a "mass" attribute extractor to have a value of "heavy" for the "mass" attribute, item images (d) and (i) depict items are analyzed by the "mass" attribute extractor to have a value of "middle" for the "mass" attribute, and item images (e) and (j) depict items are analyzed by the "mass" attribute extractor to have a value of "light" for the "mass" attribute. Item images (k) and (n) are analyzed by a "formality" attribute extractor to have a value of "formal" for the "formality" attribute, item images (l) and (o) are analyzed by the "formality" attribute extractor to have a value of "middle" for the "formality" attribute, and items (m) and (p) are analyzed by the "formality" attribute extractor to have a value of "informal" for the "formality" attribute. Item image (q) is analyzed by a "tufted" attribute extractor to have a value of "tufted" for the "tufted" attribute, and item image (r) is analyzed by the "tufted" attribute extractor to have a value of "not tufted" for the "tufted" attribute.

Table 1 below shows the precision and recall performance for the style, material, mass, formality, line, tufted or not, and color attribute extractors.

TABLE 1

| Attribute | Output classes | Categories | Precision | Recall |
|---|---|---|---|---|
| style | 3 styles | sofa, chair | 0.82 | 0.80 |
| style | 8 styles | coffee table, end table | 0.82 | 0.64 |
| style | 8 styles | area rug | 0.82 | 0.64 |
| material | leather, fabric | sofa, chair | 0.89 | 0.89 |
| mass | heavy, middle, light | sofa, chair | 0.85 | 0.66 |
|  |  | coffee table, end table | 0.87 | 0.56 |
| formality | formal, middle, informal | sofa, chair | 0.88 | 0.57 |
|  |  | coffee table, end table | 0.81 | 0.43 |
|  |  | area rug | 0.91 | 0.76 |
|  |  | table lamp, floor lamp | 0.81 | 0.40 |
| line | straight, curved | sofa, chair | 0.61 | 0.58 |
|  |  | coffee table, end table | 0.97 | 0.91 |
| tufted | tufted, not | sofa, chair | 0.77 | 0.78 |
| color | 19 colors | sofa, chair | 0.80 | 0.12 |

In table, 1, the 3 styles are modern, mid-century, and traditional. The first 8 styles are modern, traditional, mid-century, industrial, glam, coastal, rustic, and global. The second 8 styles are coastal, French country, global, mid-century, modern, natural fiber, braided, and traditional. The 19 colors are brown, grey, black, white, blue, beige, red, gold, silver, ivory, multicolor, natural, green, orange, yellow, purple, stone, neutral, and pink. Thus, each attribute extractor can be trained to determine, from a given image, which of several possible output categories for a particular attribute is depicted by that image. It will be appreciated that the specific attributes can vary from the presented examples without departure from the scope of this disclosure.

Overview of Example Execution Environment

Figure 2:
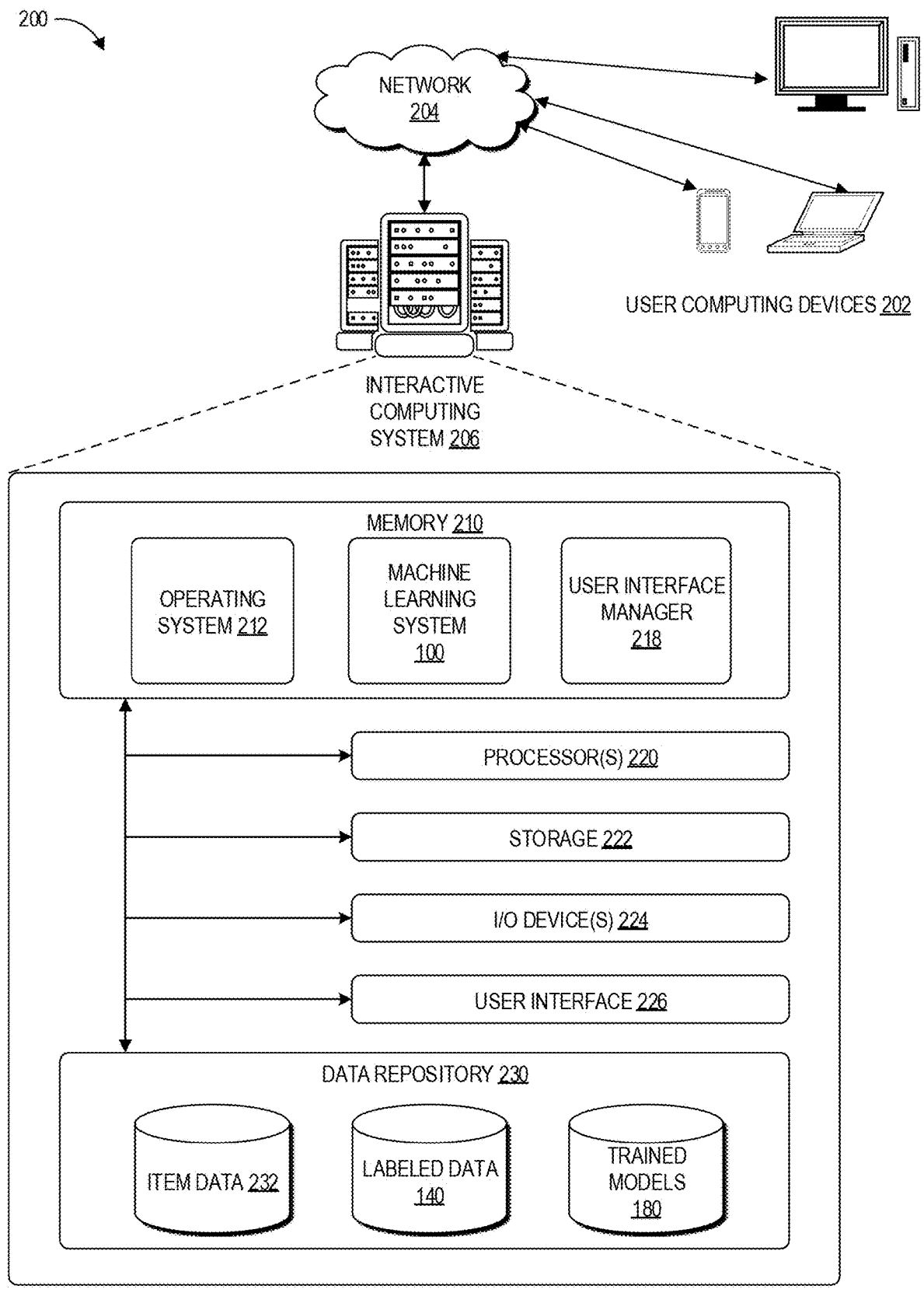
FIG. 2 illustrates a schematic block diagram of an illustrative operating environment in which an interactive computing system, for example including the machine learning systems of FIGS. 1A and 1B, provides visually complementary item collection recommendations.

FIG. 2 illustrates a schematic block diagram of an illustrative operating environment 200 in which an interactive computing system 206, for example including the machine learning system 100 of FIGS. 1A and 1B, provides visually complementary item collection recommendations. The interactive computing system 206 is discussed in the example context of an electronic catalog of items.

The interactive computing system 206 can communicate over network 204 with user devices 202. The network 204 can include any appropriate network, including an intranet, the Internet, a cellular network, a local area network or any other such network or combination thereof. User devices 202 can include any network-equipped computing device, for example desktop computers, laptops, smartphones, tablets, e-readers, gaming consoles, and the like. Users can access the interactive computing system 206 and interact with items therein via the network 404 and can be provided with recommendations via the network 204.

The interactive computing system 206 may include one or more computers, perhaps arranged in a cluster of servers or as a server farm. The memory and processors that make up these computers may be located within one computer or distributed throughout many computers (including computers that are remote from one another) as detailed herein. These servers may be configured to train and use value imputation models, and manage searches and recommendations. For example, the interactive computing system 206 may be configured to manage recommendations offered in connection with an electronic marketplace.

The interactive computing system 206 may include at least one memory 210 and one or more processing units (or processor(s)) 220. The memory 210 may include more than one memory and may be distributed throughout the interactive computing system 206. The memory 210 may store program instructions that are loadable and executable on the processor(s) 220 as well as data generated during the execution of these programs. Depending on the configuration and type of memory, the memory 210 may be volatile (such as random access memory ("RAM")) and/or non-volatile (such as read-only memory ("ROM"), flash memory, or other memory). In some examples, the memory 210 may include multiple different types of memory, such as static random access memory ("SRAM"), dynamic random access memory ("DRAM"), or ROM.

The memory 210 can store the program instructions as a number of modules that configure processor(s) 220 to perform the various functions described herein, for example operating system 212 for interacting with the computing system 200, as well as the machine learning system 100 and user interface manager 218, which can be in direct communication with one another or distributed among computing devices within a networked computing system and in communication with each other. The user interface manager 218 can include the training user interface manager 130 as well as a module for configuring recommendations user interfaces, for example as described with respect to FIGS. 5A, 5B, and 6. Although not shown, the memory 210 may also store a search module that allows a user to search for items within the electronic catalog, and a recommendation engine that implements the trained AI stylist model 180 to identify collections of items to recommend to users.

The processor 220 may include one or more general purpose computers, dedicated microprocessors, graphics processors, or other processing devices capable of communicating electronic information. Examples of the processor 220 include one or more application-specific integrated circuits ("ASICs"), graphical processing units ("GPUs"), field programmable gate arrays ("FPGAs"), digital signal processors ("DSPs") and any other suitable specific or general purpose processors. The processor 220 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 206 may also include additional storage 222, which may include removable storage and/or non-removable storage. The additional storage 222 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 210 and the additional storage 222, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The interactive computing system 206 may also include input/output (I/O) device(s) and/or ports 224, such as for enabling connection with a keyboard, a mouse, a pen, a voice input device, a touch input device, a display, speakers, a printer, or other I/O device. The interactive computing system 206 may also include a user interface 226. The user interface 226 may be utilized by a user to access portions of the interactive computing system. In some examples, the user interface 226 may include a graphical user interface, web-based applications, programmatic interfaces such as application programming interfaces (APIs), or other user interface configurations. The user interface 226 can include displays of the feedback provision user interfaces described herein. In some embodiments, the I/O device(s) and/or ports 224 and user interface 226 can be part of a user computing device accessing interactive computing system 206 via network 204.

The interactive computing system 206 also includes a data store 230. In some examples, the data store 230 may include one or more data stores, databases, data structures, or the like for storing and/or retaining information associated with the computing system 200. Thus, the data store 230 may include data structures, such as item data repository 232, labeled data repository 140, and trained models data repository 180. These each comprise one or more physical data storage devices storing the designated data. The data stored in the labeled data repository 140 and trained models data repository 180 is described above with respect to FIG. 1A. The item data repository 232 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 232 also stores data representing item images.

Overview of Example Supervised Training and Associated User Interface

Figure 3:
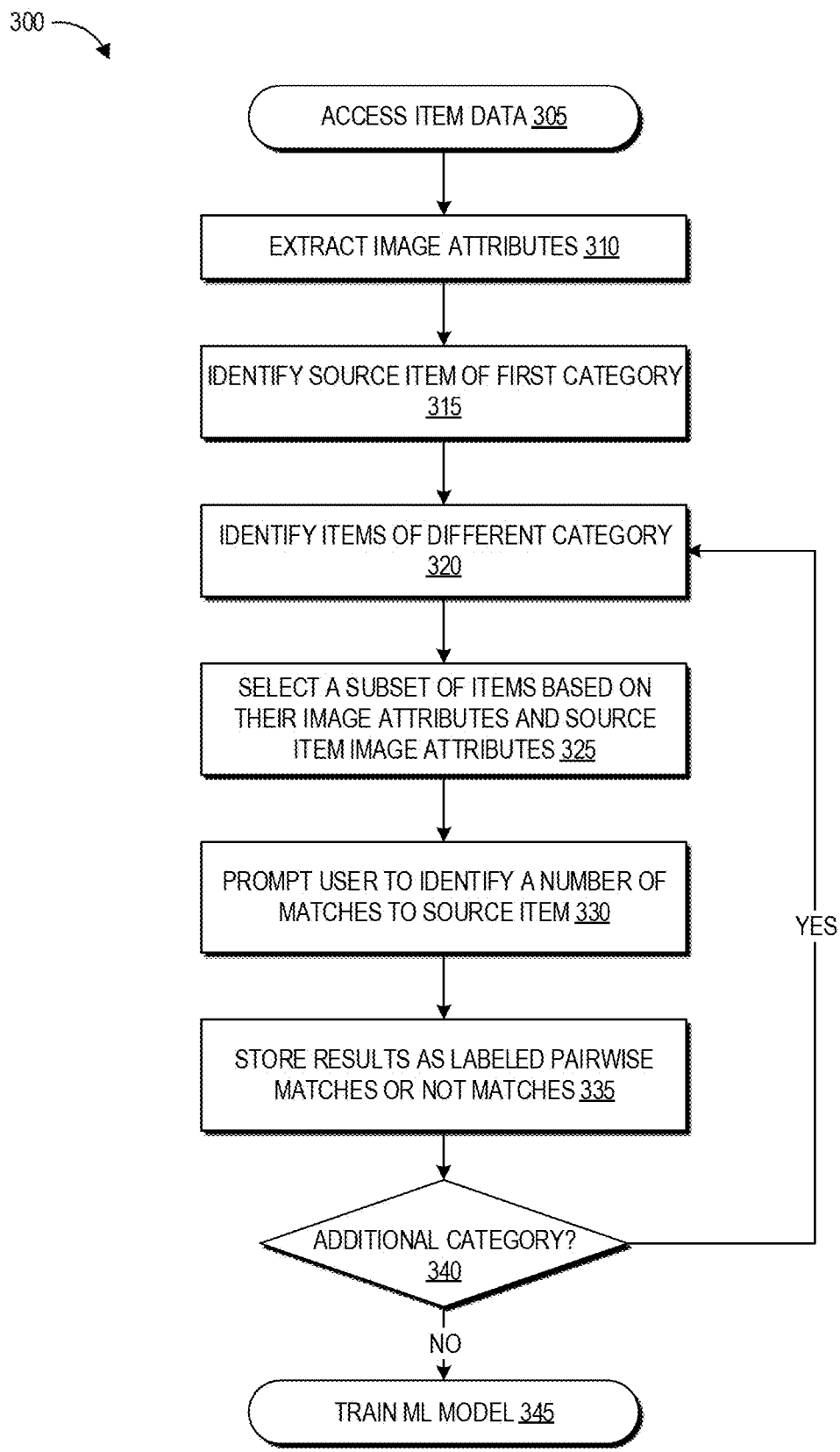
FIG. 3 is a flow diagram depicting an illustrative embodiment of a process that may be implemented for reducing the human burden during supervised training of the machine learning system of FIG. 1A.

FIG. 3 is a flow diagram depicting an illustrative embodiment of a process 300 that may be implemented for reducing the human burden during supervised training of the machine learning system of FIG. 1A. For example, consider the task of asking a professional interior designer to create a living room collection, including items from eight different categories, from electronic catalog images. An example electronic catalog can have hundreds of thousands or millions of possible items in each category. Sorting through all of those images in order to generate a collection would require massive lengths of time. The process 300 of FIG. 3 represents a training data labeling pipeline that efficiently collects, in one example implementation, labels for around 1.2 million complementary pairs (positive cases) and around 1.2 million non-complementary pairs (negative cases). In that example implementation, the total time cost for the professional interior designer amounted to roughly 100 working hours. Using a naïve approach where designers build entire 8-item collections from scratch from the catalog, the estimated time cost to acquire the same quantity of labeled data is around 21,000 hours. As such, the process 300 represents significant time savings for human efforts in generating labeled training data.

At block 305, the machine learning system 100 accesses item data 305, for example from the item data repository 232. Item data can include, for a number of different items, at least one image and data representing categorization of the items, for example according to certain browse nodes in an item hierarchy. The image data may be (or have been) filtered as described with respect to the ML filtering module 110. Further, a human supervising the process 300 may remove certain images, such as images without a clear view of the item, offensive images, or miscategorized images. Such data cleaning is non-trivial and can significantly improve the quality of the trained AI stylist model 180. Some implementations of the process 300, for example to train the AI stylist model to generate collections of home furnishings, may use eight (or more or less) categories of items. The machine learning system 100 may randomly sample a certain number of item images from each category, for example around 10,000 in some implementations (and more or less in others), for further use in the process 300.

At block 310, the machine learning system 100 extracts attributes of the images of the items. The attributes can be a predefined set of attributes relating to the aesthetic quality of the items, for example the attributes described with respect to FIG. 1C (and/or other attributes). Each attribute can be extracted using a different one of the attribute extractors 120.

At block 315, the machine learning system 100 identifies a source item of a first category. The first category may be identified as being a "focal point" of the desired collection, for example a sofa for a living room, a bed (or bedding) for a bedroom, or a dress for a women's formal outfit, to name a few examples. Block 315 can involve sampling a certain number of items (for example 100, or more or less) from a source category, for example sofas in the context of building living room collections. This sampling may be random, or may be stratified sampling performed to randomly but evenly sample images possessing different values of the attributes extracted from the item images. For example, a sofa category can be sampled by style, color, and formality. Each of the sampled items can be used as the source item in a different iteration of blocks 320-340 of the process 300. Though not shown as a loop, blocks 320-340 can be performed a number of times, each time using a different source item.

At block 320, the machine learning system 100 identifies items in a different category from the source item. The category can be any of a number of different categories desired for the collection in some implementations, or can be a next category specified in a pre-determined ordering of the categories. To illustrate, in the example of a living room collection having a sofa as the source item, block 320 can involve narrowing down the space of potential matches of chairs, for example through matching rules based on the extracted attributes. The matching rules can specify which values of the extracted attributes coordinate with one another. Images having attributes that are not specified as coordinating by the rules may not be selected for presentation to the stylist.

At block 330, the training user interface manager 130 prompts the user to identify a number of matches to the source item. In some implementations, the user can be prompted to identify, from the displayed item images in the second category, all items that match the source item. Beneficially, this allows negative cases to be inferred for the non-selected images. Positive cases can be established between the source image and the selected images. In some implementations, pairwise positive cases can be established between each selected image and each other selected image of an item in a different category, in order to expand the volume of pairwise positive training cases. Similarly, pairwise negative cases can be established between the source item image and the non-selected images, and optionally between the selected images and the non-selected images. As will be appreciated, each pair represents two items, each from a different category.

After selecting the prompted number of matches, the user can be prompted to select a "best" match. This "best" match image can be displayed with the source item image in further iterations of blocks 320-335 for building a collection with the source item. In some implementations, match selections for the next category can be established as positive training cases with both the source image and the best match image(s). In some implementations, rather than prompting the user for a best match, one of the selected images can be randomly chosen.

At block 335, the machine learning system 100 can store the results as labeled pairwise matches or not matches, according to the different implementations described above. For example, the machine learning system 100 can store the pairwise labels in the labeled training data repository 140. In some implementations, the matching items chosen in each category are assumed to be complementary to the matching items in all the other categories, which is a feature that enables the process 300 to collect a large amount of labeled data.

At block 340, the machine learning system 100 determines whether the match selection steps should be performed for an additional category. For example, a living room collection may include items from eight categories—the sofa, a chair, a coffee table, a side table, a rug, a table lamp, a floor lamp, and a wall decoration. Different types of collections can include one (or more) items from each of a number of different categories. When the determination at block 340 is yes, blocks 320-335 can be repeated for the next category.

When the determination at block 340 is no, the process 300 transitions to block 345 to train the AI stylist model 175. For example, as described above with respect to FIG. 1A, numerical representations of the attributes of each item in a pair can be concatenated with feature vectors representing the images of the items. A neural network can be trained to predict positive and negative cases from such concatenated vectors.

Figure 4:
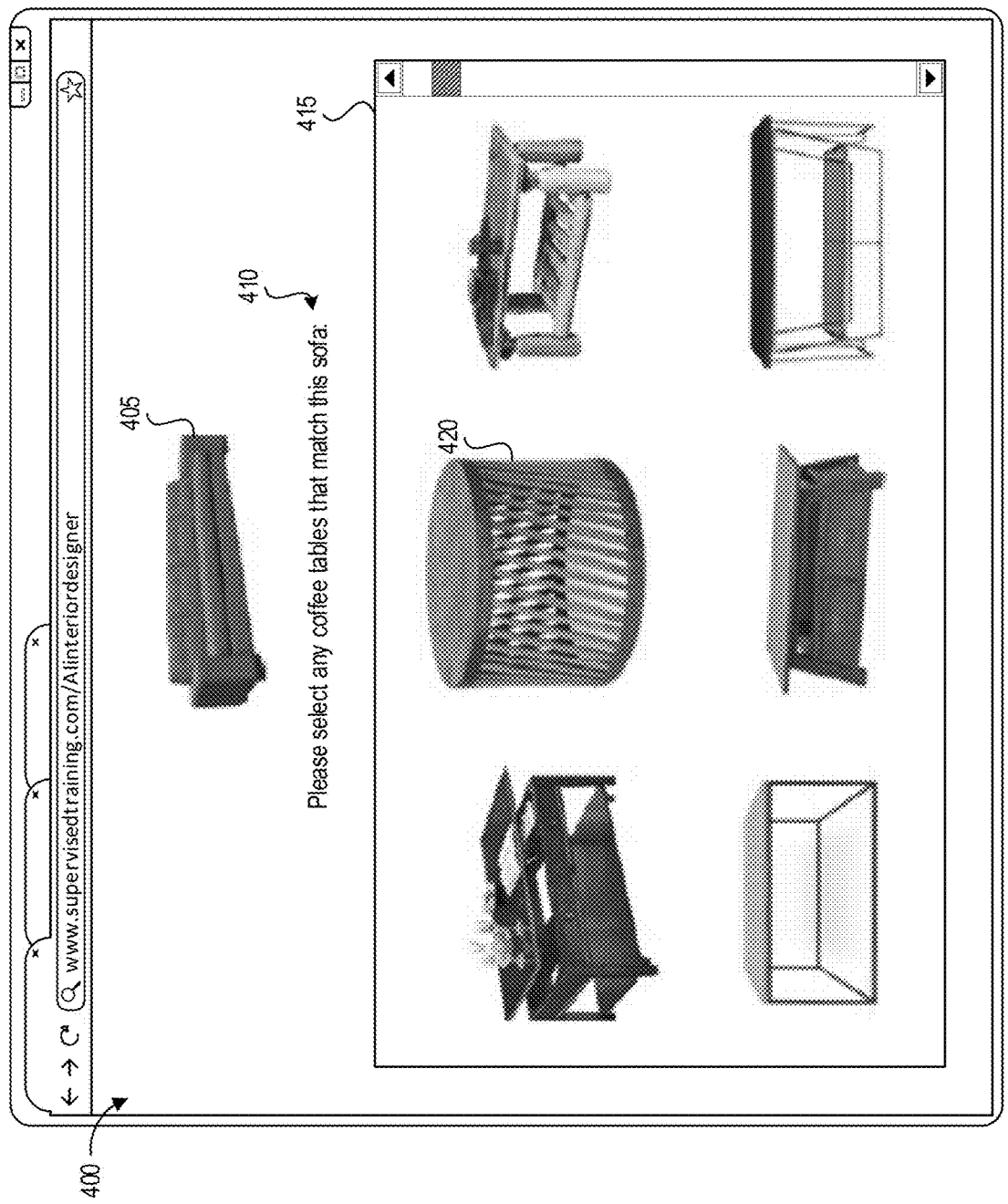
FIG. 4 depicts an example graphical user interface that can be used during the process of FIG. 3.

FIG. 4 depicts an example graphical user interface 400 that can be used during the process 300 of FIG. 3. The user interface 400 depicts an image of a source item, in this example sofa 405. The user interface 400 includes a prompt asking the user to select any matching coffee tables from a region 415 including a set of images of coffee tables, redacted as described with respect to FIG. 3 in order to pre-filter out unlikely matches. Each image 420 may be selectable, and may change appearance (e.g., by being highlighted, outlined) in response to being selected. Beneficially, in combination with the image set redaction based on attributes of the source item image and the candidate match images, such a user interface 400 can assist a human stylist with providing a large quantity of labeled training data in a reduced amount of time. For example, in the original color images the sofa 405 is a deep red color. The displayed coffee tables are all of warm wood tones and/or red colorings.

Figure 5A:
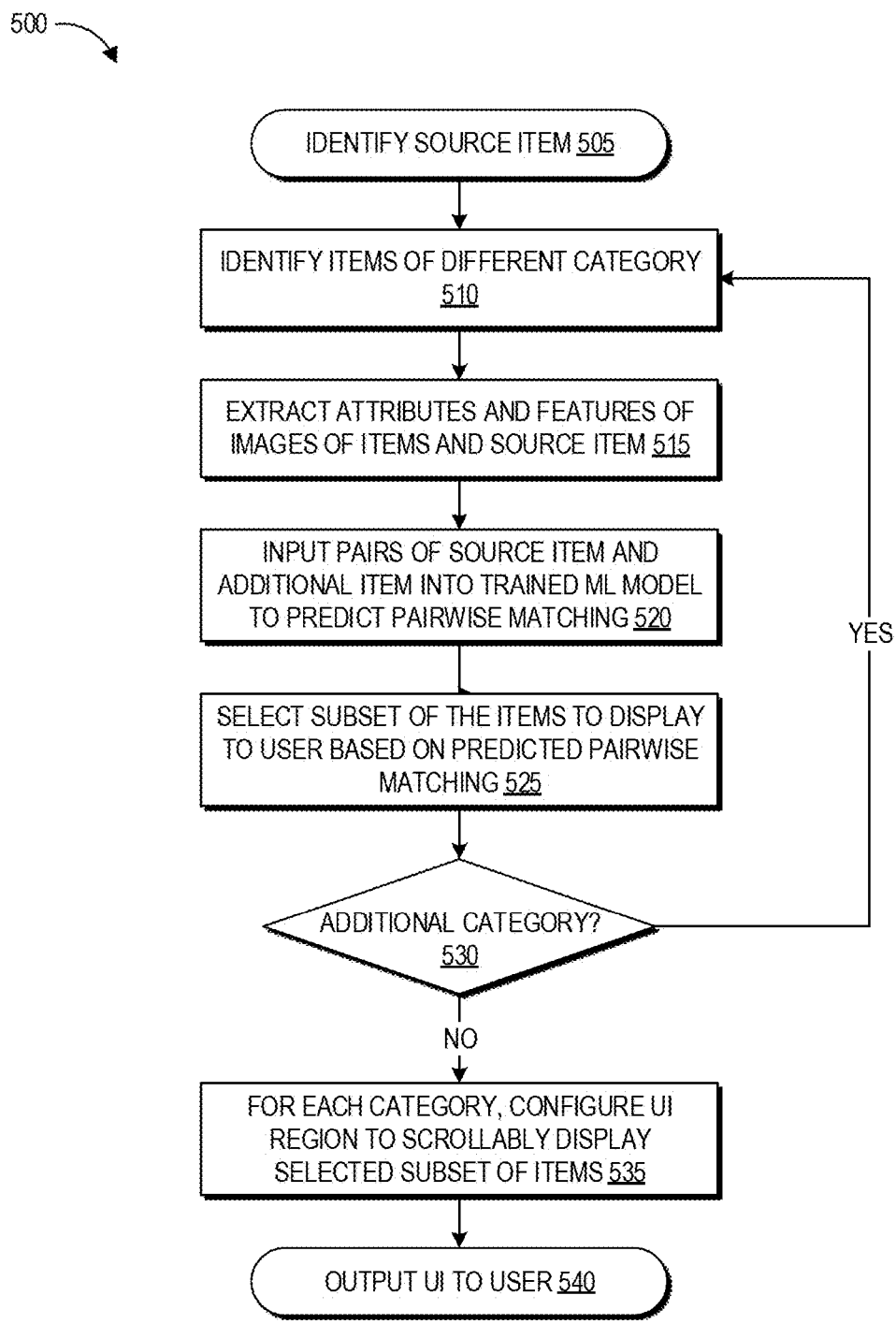
FIG. 5A is a flow diagram depicting an illustrative embodiment of a process for generating a user interface for a collection of visually complementary items, identified using the trained machine learning system of FIG. 1B.

Overview of Example Artificially Intelligent Stylist Usage and Associated User Interfaces FIG. 5A is a flow diagram depicting an illustrative embodiment of a process 500 for generating a user interface for a collection of visually complementary items, with the collection identified using the trained machine learning system 100. The process 500 can be implemented by the user interface manager 218 and machine learning system 100, among other suitable systems.

Consider a set of items each represented by an image, belonging to one of n categories $C_1, C_2, C_3, \ldots, C_n$. Let $P=U_{i \ne j} C_i \times C_j$, where i and j represent the indices of different items x. A pair of items can be represented as $(x_i, x_j) \in P$. A pair is visually complementary if the two items are visually appealing when placed together. A collection is a set of n items, one from each $C_n$, that are visually appealing when placed together. Given a source item $x_1 \in C_1$, the machine learning system 100 executes the process 500 to find a set of n−1 items that form a collection with source item $x_i$.

At block 505, the machine learning system 100 identifies a source item (e.g., an item upon which recommendations for visually complementary items will be based. This can be represented as $x_1 \in CI$, indicating that item $x_1$ belongs to category $C_1$.

At block 510, the machine learning system 100 identifies a number of items in a different category than the source item. The category can be any of $C_2, C_3, \ldots, C_n$ in some implementations, or can be a next category specified in a pre-determined ordering of the categories $C_1, C_2, C_3, \ldots, C_n$. The categories can be pre-defined by a stylist or engineer building the machine learning system 100 and/or can be user-specified.

At block 515, the machine learning system 100 extracts attributes of the images of the items. The attributes can be a predefined set of attributes relating to the aesthetic quality of the items, for example the attributes shown in FIG. 1C (and/or others). Each attributes can be extracted using a different one of the attribute extractors 120. It will be appreciated that in some implementations these attributes may have already been extracted during the training process 300. In such implementations, the extracted attributes can be stored in association with the corresponding items (and/or corresponding item images) in the item data repository 232. As such, block 515 may involve accessing pre-extracted features from a data repository.

At block 520, the machine learning system 100 inputs pairs of items into the trained artificially intelligent stylist model 180 to determine whether or not the items match. Each pair can include the source item and a different one of the items in the different category. The artificially intelligent stylist model can predict pairwise matching of these items, for example with a binary output (e.g., 0 for not matching, or 1 for matching) and/or with a probabilistic output (e.g., a value between 0-1 representing a probability that the two items match). In some implementations block 525 may additionally check whether any identified matches (or probably matches) match (or are likely to match) with another item besides the source item, for example another item added to the collection.

At block 525, the machine learning system 100 can select a subset of the items in the different category to display to the user based on the predicted pairwise matching determined at block 510. For example, in the implementation that uses a binary output, some or all of the identified matches can be selected. A subset of the identified matches can be selected based on other filters such as availability, price range, shipping time, item origin, and the like, which may be one or both of implicitly determined based on user behavior or explicitly indicated by the user.

As illustrated, blocks 510-525 form a loop that can be implemented in an iterative fashion to build a collection of items. As described above, the source item $x_1$ belongs to category $C_1$. Prior to implementation of the process 500, in some embodiments a human stylist and/or engineer can order the remaining categories $C_2, C_3, \ldots, C_n$ to predetermine the order in which they will be explored by the iterations of blocks 510-525. At the first iteration of blocks 510-525, the machine learning system 100 can find a second item $x_2 \in C_2$ that is the most likely complementary item to $x_i$ (and/or a set of predicted matches). At the second iteration of blocks 510-525, the machine learning system 100 can find a third item $x_3 \in C_3$ that is the most likely complementary item to both $x_i$ and $x_2$ (and/or a set of predicted matches). This can be repeated to build this entire collection across $C_n$ categories. The identified items for that collection can then be removed from the candidate pool of items, and the process 500 implemented again using the redacted candidate pool to generate one or more additional collections. In some implementations, the second and any subsequent iterations of blocks 510-525 may instead just check matches against the source item, rather than a set of items across the analyzed categories. In such implementations, the process 500 may be implemented just once to identify a pool of potential matches with the source item for each of the analyzed categories.

When all of the desired categories have been analyzed using blocks 510-525, the determination at block 530 is no and the process 500 transitions to block 535. At block 535, the user interface manager 218 can configure a collection display user interface to display a number of windows or regions in addition to an image of the source item. Each region is used to display the items selected for a particular category. In some embodiments, the process 500 can identify a set of matching items for each category. The user interface manager 218 can configure each window to be separately scrollable, for example by providing back/forward navigation options or other suitable list navigation options (e.g., instructions for touch-sensitive swiping) that allow the user to switch the display in that window from image to image of the set of matching items. In other embodiments, the process 500 can generate a number of different complete collections, and the user interface manager 218 can configure the user interface to allow the user to scroll (or otherwise navigate) from collection to collection.

Once the user interface is configured, the process 500 transitions to block 540 to output the user interface to a user, for example to a browser or application running on a user computing device 202.

Figure 5B:
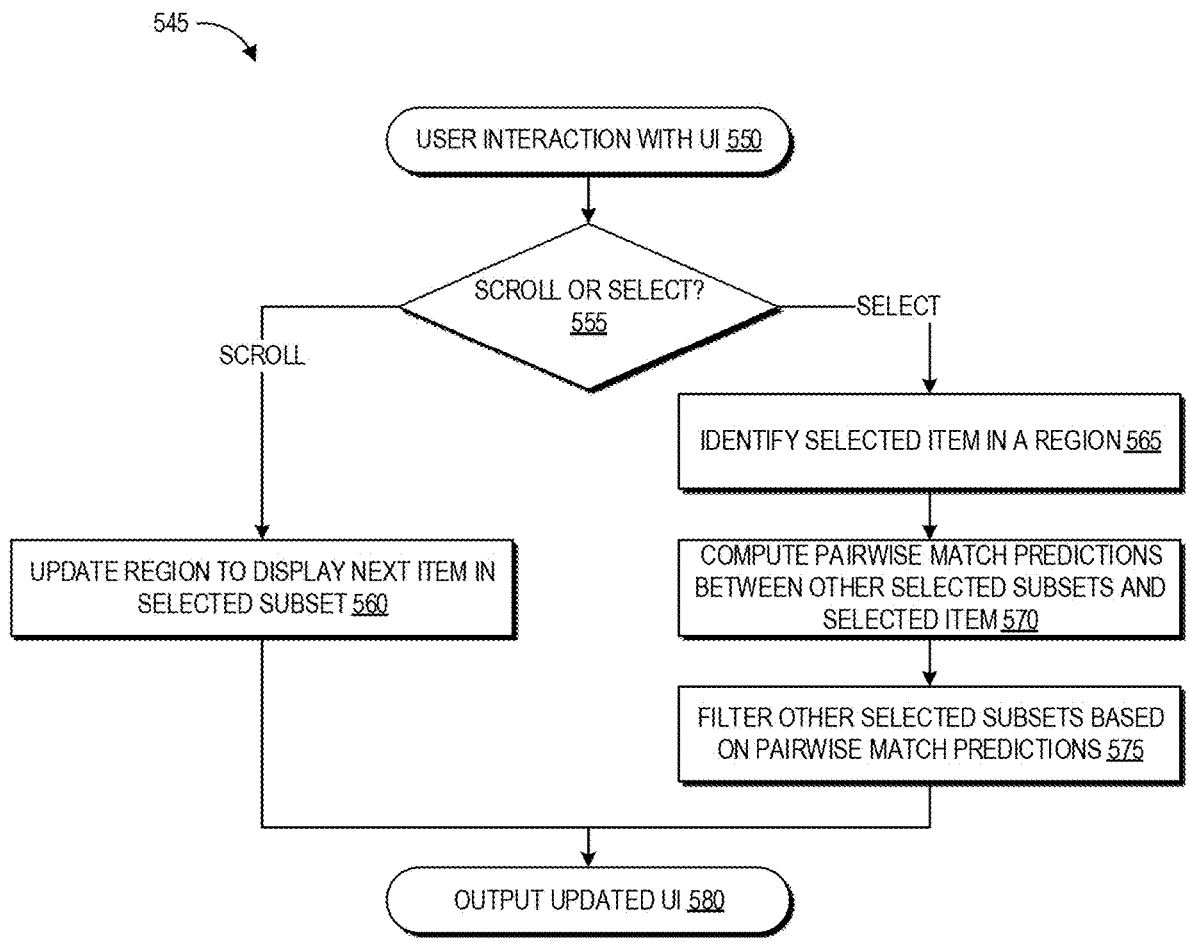
FIG. 5B is a flow diagram depicting an illustrative embodiment of a process for updating the user interface of FIG. 5A responsive to user interactions.

FIG. 5B is a flow diagram depicting an illustrative embodiment of a process 545 for updating the user interface of FIG. 5A responsive to user interactions. The process 545 can be implemented by the user interface manager 218 and machine learning system 100, among other suitable systems.

At block 550, the user interface manager 218 detects user interaction with the user interface. Different types of user interactions necessitate different types of updates, so the process 545 transitions to block 555 to determine whether the user interaction was a scroll (or other navigational movement) to a new collection recommendation or a selection of a displayed collection recommendation. With respect to the latter, if a user likes one of the items displayed for one of the categories, the user may be able to select that item for their collection (e.g., by adding that item to an electronic shopping cart or selecting an "add to collection" feature).

If the user has scrolled (or swiped, or interacted with other suitable user interface navigational controls), the process 545 transitions to block 560. At block 560, some implementations of the process (see, e.g., FIG. 6A) can update a region within the user interface corresponding to one category of items in the collection. The user interface manager 218 can update this region to display the next item in the selected subset for this category. Other implementations of the process (see, e.g., FIG. 6B) can update the entire collection (including the same source item). From block 560, the process 600 transitions to block 580 to output the updated user interface to the user.

If the user has instead selected an item in addition to the source item for the collection, the process 545 transitions to block 565. At block 565, the user interface manager 218 identifies which item was selected in which region. The user interface manager 218 may fix or lock this item within that region.

At block 570, the trained AI stylist model 180 can compute pairwise match score predictions between the items selected for the remaining category regions in the user interface and the selected item. At block 575, the interface manager 218 may filter out any items that have less than a threshold match score with the selected item so that they are no longer displayed in their respective regions. In some embodiments, these new match scores with the selected item can be used together with the match scores between these items and the source item to generate a composite match score, and the items from other categories can be ranked and ordered for display in the user interface based on their composite match score. This can yield an overall collection that matches both with the source item and the selected item. From block 575, the process 600 transitions to block 580 to output the updated user interface to the user.

Figure 6A:
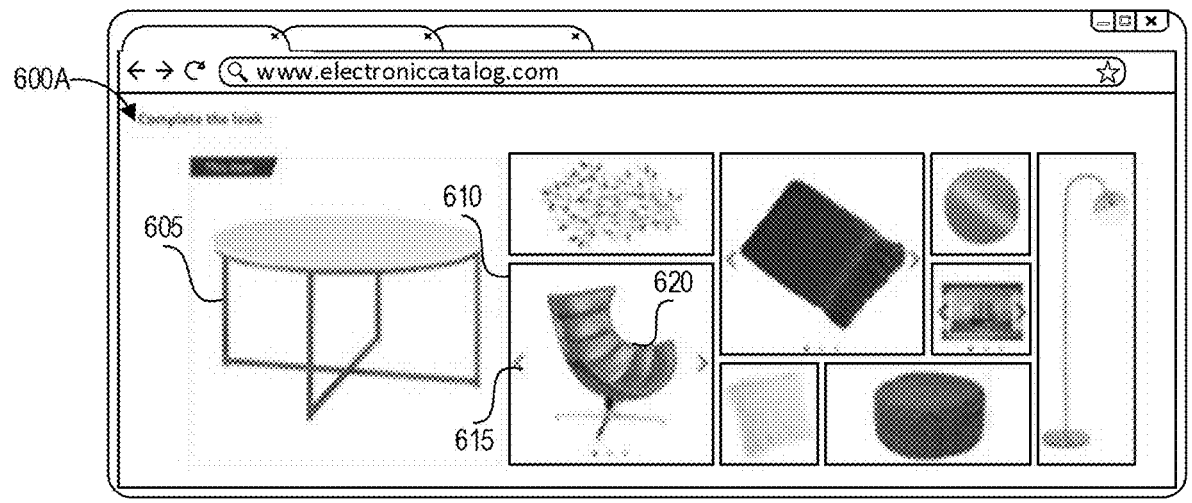
FIGS. 6A and 6B depict example graphical user interfaces that can be generated using the processes of FIGS. 5A and 5B.
Figure 6B:
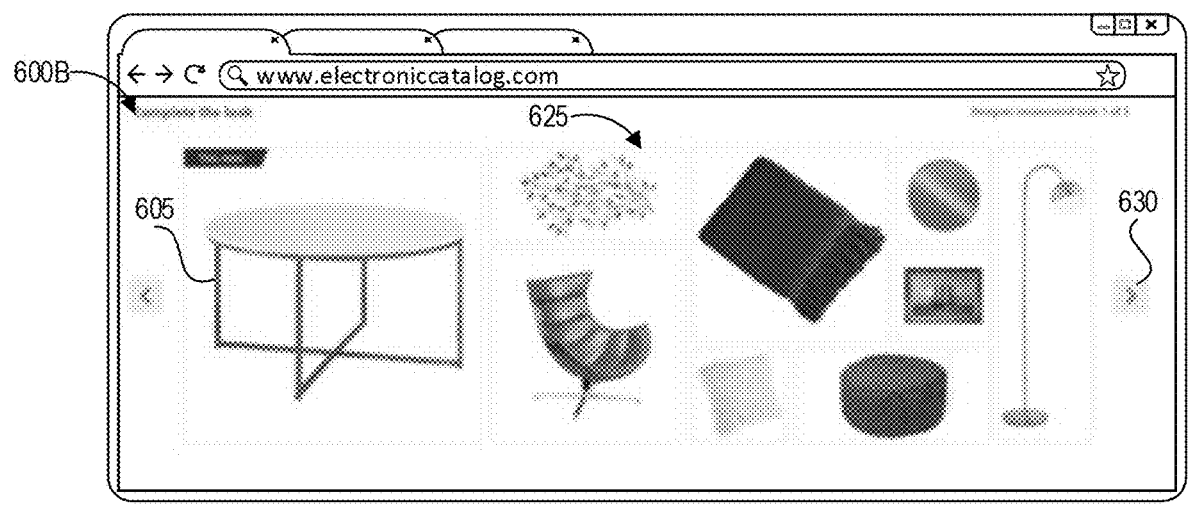

FIGS. 6A and 6B depict example graphical user interfaces that can be generated using the processes of FIGS. 5A and 5B. FIG. 6A illustrates a first user interface 600A that includes separately navigable windows 610 for different categories of items in the collection. In FIG. 6A, the source item 605 (here, a table) is displayed together with furnishing items from other categories. The window 610 for the chair category displays an image of a chair 620, and is provided with navigational elements 615 to enable the user to scroll to other chairs that have been identified as potential matches with the table 605. Although not illustrated, the user interface can additionally include user-selectable options to view (e.g., as a pop up, popover, or modal window) further details about a given item, including an option to purchase the item, as well as user-selectable options to add a given item to the collection. The user interface 600A can be generated, for example, using a version of the process 500 that iterates through blocks 510-525 to identify multiple candidate match items within each of a number of categories.

FIG. 6B illustrates a second user interface 600B that displays an entire collection, including the source item 605 and a set of items 625 in other categories. However, in contrast to the user interface 600A of FIG. 6A, the user interface 600B of FIG. 6B provides navigation features 630 that enable the user to scroll through entire collections of items (in some embodiments, with each collection including the source item 605). The user interface 600A can be generated, for example, using a version of the process 500 that identifies a single most likely match at block 525 each time it iterates through bock 510-525, and also iterates through the process 500 multiple times to identify multiple collections each including a different set of items in addition to the source item.

Overview of Example Collections Comparison

Figure 7A:
FIG. 7A depicts an example collection of visually complementary items identified by the trained machine learning system of FIG. 1B.

FIG. 7A depicts an example collection of visually complementary items identified by the trained AI stylist model 180. The collection includes the source item 700 (here, a traditionally-styled red velvet loveseat sofa) and identified visually complementary items 705 across seven other categories (chair, coffee table, side table, rug, table lamp, floor lamp, and wall art). The complementary items 705 include (from left to right): a beige leather armchair, a brown wooden coffee table, a brown wooden end table, a beige rug, a table lamp with a brown stand and beige shade, a floor lamp with a brown stand and a beige shade, and wall art with a predominantly beige color scheme. The collection of FIG. 7A is complementary in terms of color (red, brown, and beige), line (predominantly straight), formality (middle level), style (traditional), and mass (medium to heavy), among other attributes. FIG. 7A illustrates the level of visual coordination (across a number of visual features/attributes) between items in a collection generated by the trained AI stylist model 180.

Figure 7B:
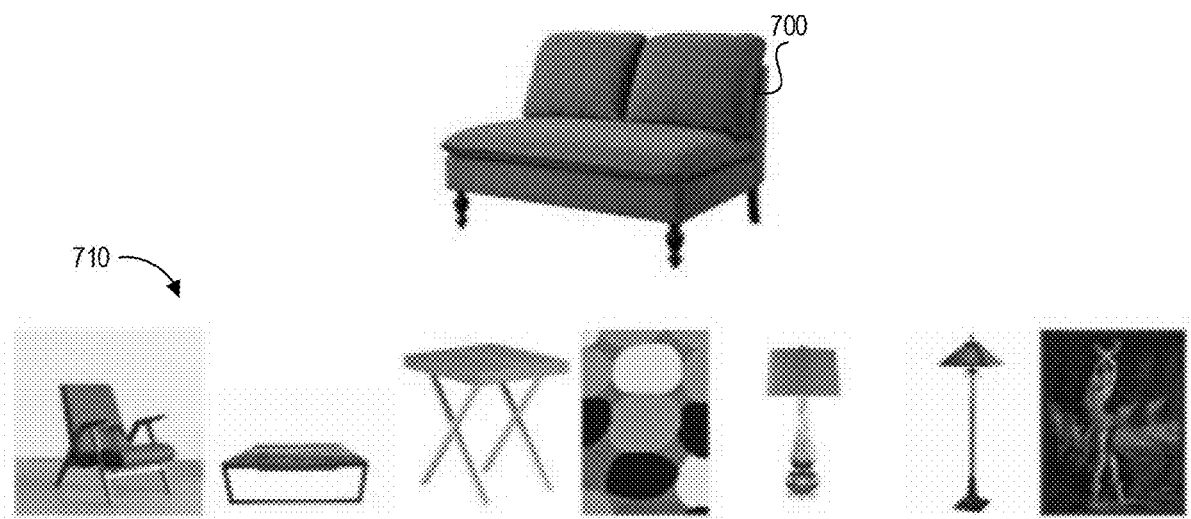
FIG. 7B depicts an example collection of items identified by random selection.

FIG. 7B depicts an example collection of items identified by random selection. The collection includes the same source item 700 (again, a traditionally-styled red velvet loveseat sofa) and randomly selected items 710 across the seven other categories (chair, coffee table, side table, rug, table lamp, floor lamp, and wall art). The randomly selected items 710 include (from left to right): a blue armchair (in mid-century style), an aqua and red coffee table (in modern style), a light wooden side table (in modern style), a multicolored rug (in modern style), a table lamp with a silver stand and a beige shade (in global style), a floor lamp with a black stand and an orange shade (in modern style), and a painting of a ballerina with a predominantly red color scheme. FIG. 7B illustrates how a randomly selected collection includes a variety of styles and colors, among other attributes. The comparison of FIG. 7B with FIG. 7A illustrates how the trained AI stylist model 180 performs better than a random baseline for identifying collections of visually complementary items.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing system comprising:
    at least one electronic data repository storing:
        item data including, for each item of a plurality of items of an electronic catalog of items, an image of the item and a category of a plurality of categories associated the item; and
        parameters of a machine learning system including (1) an attribute extraction model trained to determine aesthetic attributes of an item based on an analysis of an image of the item, wherein the aesthetic attributes include a line type attribute that is not defined in the item data, wherein the attribute extraction model is trained to assign to the line type attribute a value that specifies a type of line detected in the image, and (2) an artificially intelligent stylist model trained to identify particular ones of the plurality of items for inclusion in a visually complementary collection;

a computer-readable memory storing instructions for generating the visually complementary collection; and one or more processors in communication with the at least one electronic data repository and the computer-readable memory, the one or more processors configured by the instructions to at least:

identify a source item of the plurality of items to use as a basis for generating the visually complementary collection, the source item depicted by a first image, wherein the source item is associated with a first category of the plurality of categories;

assign a first value of the line type attribute to the source item based on analyzing pixel values of the first image using the attribute extraction model;

for each item of a set of items of different categories than the first category:

assign an additional value of the line type attribute to the item based on analyzing pixel values of an image depicting the item, and determine a likelihood that the item matches the source item at least partly by providing the first value and the additional value as input into the artificially intelligent stylist model;

generate a user interface for presenting the visually complementary collection, the user interface including the first image of the source item and a plurality of windows for depicting items of the different categories;

populate the plurality of windows with images of particular ones of the set of items, the particular ones of the set of items identified based on the determined likelihoods; and cause output the user interface for presentation to a user.

2. The computing system of claim 1, wherein the one or more processors are further configured by the instructions to at least, for a first window of the plurality of windows:

identify a second item associated with a second category of the plurality of categories, the second item depicted by a second image;

assign a second value of the line type attribute to the second item from the second image using the attribute extraction model;

provide the first value and the second value as input to the artificially intelligent stylist model; and based on an output of the artificially intelligent stylist model, determine to include the second item in the first window.

3. The computing system of claim 2, wherein the one or more processors are further configured by the instructions to at least concatenate at least a first encoding of the first value with a second encoding of the second value to generate the input.

4. The computing system of claim 3, wherein the machine learning system additionally includes a feature extractor trained to generate a feature embedding of the images, wherein the one or more processors are further configured by the instructions to at least:

generate a first feature embedding of the first image using the feature extractor;

generate a second feature embedding of the second image using the feature extractor; and concatenate the first and second feature embeddings with the first encoding of the first value and the first encoding of the second value to generate the input.

5. The computing system of claim 1, wherein the one or more processors are further configured by the instructions to at least:

identify that the user has selected an item depicted in one of the plurality of windows as preferred by the user for the visually complementary collection, the item depicted by a second image; and update the particular ones of the additional images displayed in at least one other window of the plurality of windows based on identifying, using the artificially intelligent stylist model, which of the particular ones of the additional images visually complement both the first image and the second image.

6. The computing system of claim 1, wherein the first value of the line type attribute specifies a curved line type.

7. The computing system of claim 1, wherein the first value of the line type attribute specifies a straight line type.

8. The computing system of claim 1, wherein the aesthetic attributes additionally including a mass attribute that classifies items in terms of item mass.

9. The computing system of claim 1, wherein the source item is an item of furniture.

10. A computer-implemented method, comprising:

identifying a source item to use as a basis for generating a visually complementary collection of items, the source item depicted by a first image and associated with a first category a plurality of categories;

assigning a first value of a line type attribute to the first item based on analyzing the first image using a trained attribute extraction model, the line type attribute representing a type of line detected;

identifying a second category of the plurality of categories to be included in the visually complementary collection;

identifying a second item associated with the second category, the second item depicted by a second image;

assigning a second value of the line type attribute to the second item based on analyzing the second image using the trained attribute extraction model;

providing the first and second values of the line type attribute to an artificially intelligent stylist model trained to identify visually complementary items; and based on an output of the artificially intelligent stylist model indicating that the first and second items are predicted to be visually complementary, generating a user interface presenting the first image of the source item and the second image of the second item as at least a portion of the visually complementary collection.

11. The computer-implemented method of claim 10, further comprising:

identifying a third category of the plurality of categories to be included in the visually complementary collection;

identifying a third item associated with the third category, the third item depicted by a third image;

assigning a third value of the line type attribute to the third item based on analyzing the third image using the trained attribute extraction model;

providing the first and third values of the line type attribute to the artificially intelligent stylist model to generate a first additional output indicating that the first and third items are predicted to be visually complementary; and based at least partly on the first additional output, including the third image of the third item in the visually complementary collection.

12. The computer-implemented method of claim 11, further comprising:

providing the second and third values of the line type attribute to the artificially intelligent stylist model to generate a second additional output indicating that the second and third items are predicted to be visually complementary; and based at least partly on the second additional output, including the third image of the third item in the visually complementary collection.

13. The computer-implemented method of claim 10, further comprising:

receiving, based on a user interaction with the user interface, an indication of user preference for a third item to be included in the visually complementary collection;

assigning a third value of the line type attribute to the third item based on analyzing a third image depicting the third item using the trained attribute extraction model;

providing the second and third values of the line type attribute to the artificially intelligent stylist model to generate an additional output indicating that the second and third items are predicted to be visually complementary; and including the second image of the second item in the user interface based at least partly on the additional output.

14. The computer-implemented method of claim 10, further comprising:

generating feature embeddings of the first and second images using a trained feature extraction model; and additionally providing the feature embeddings with the first and second values of the attribute to the artificially intelligent stylist model.

15. The computer-implemented method of claim 10, wherein the user interface includes a plurality of windows, wherein generating the user interface comprises:

including the second image of the second item in a first window of the plurality of windows;

determining a different category for each other window of the plurality of windows; and for each different category, identifying an additional image to display in the corresponding other window based at least partly on extracting another value of the line type attribute from that additional image and providing the another value to the artificially intelligent stylist model with the first value wherein the additional image depicts an item of the different category.

16. The computer-implemented method of claim 15, further comprising:

using the artificially intelligent stylist model to identify a plurality of candidate matches to depict in each of the other windows; and providing navigation options for each of the other windows that enable a user to scroll through the plurality of candidate matches.

17. The computer-implemented method of claim 15, further comprising:

using the artificially intelligent stylist model to identify a plurality of complementary visual collections including the source item and other items for depicting in the plurality of windows, a first of the plurality of complementary visual collections including the second item; and providing navigation options that enable a user to scroll through the plurality of complementary visual collections.

18. A non-transitory computer-readable medium storing instructions that, when executed, cause at least one processor to perform operations comprising:

identifying a source item to use as a basis for generating a visually complementary collection of items, the source item depicted by a first image and associated with a first category a plurality of categories, wherein the first item is assigned a first value of a line type attribute representing a type of line detected, wherein the first value is determined from the first image using a trained attribute extraction model;

identifying a second category of the plurality of categories to be included in the visually complementary collection;

identifying a second item associated with the second category, the second item depicted by a second image, wherein the second item is assigned a second value of the line type attribute, wherein the second value is determined from the second image using the trained attribute extraction model;

providing the first and second values of the line type attribute to an artificially intelligent stylist model trained to identify visually complementary items; and based on an output of the artificially intelligent stylist model indicating that the first and second items are predicted to be visually complementary, generating a user interface presenting the first image of the source item and the second image of the second item as at least a portion of the visually complementary collection.

19. The non-transitory computer-readable medium of claim 18, the operations further comprising:

identifying a third category of the plurality of categories to be included in the visually complementary collection;

identifying a third item associated with the third category, the third item depicted by a third image, wherein the third image has a third value of the line type attribute from the third image using the trained attribute extraction model;

providing the first and third values of the attribute to the artificially intelligent stylist model to generate a first additional output indicating that the first and third items are predicted to be visually complementary; and based at least partly on the first additional output, including the third image of the third item in the visually complementary collection.

20. The non-transitory computer-readable medium of claim 19, the operations further comprising:

providing the second and third values of the line type attribute to the artificially intelligent stylist model to generate a second additional output indicating that the second and third items are predicted to be visually complementary; and based at least partly on the second additional output, including the third image of the third item in the visually complementary collection.

21. The non-transitory computer-readable medium of claim 18, the operations further comprising:

receiving, based on a user interaction with the user interface, an indication of user preference for a third item to be included in the visually complementary collection, the third item depicted by a third image, wherein the third image has a third value of the line type attribute from the third image using the trained attribute extraction model;

providing the second and third values of the line type attribute to the artificially intelligent stylist model to generate an additional output indicating that the second and third items are predicted to be visually complementary; and including the second image of the second item in the user interface based at least partly on the additional output.

22. The non-transitory computer-readable medium of claim 18, the operations further comprising:

accessing feature embeddings of the first and second images, the feature embeddings generated using a trained feature extraction model; and additionally providing the feature embeddings with the first and second values of the line type attribute to the artificially intelligent stylist model.

23. The non-transitory computer-readable medium of claim 18, wherein the user interface includes a plurality of windows, the operations further comprising:

including the second image of the second item in a first window of the plurality of windows;

determining a different category for each other window of the plurality of windows; and for each different category, identifying an additional image to display in the corresponding other window based at least partly on determining another value of the line type attribute from that additional image and providing the another value to the artificially intelligent stylist model with the first value wherein the additional image depicts an item of the different category.

24. The non-transitory computer-readable medium of claim 23, the operations further comprising:

receiving indication of a user interaction with one of the plurality of windows selecting a depicted item for inclusion in the collection; and using the artificially intelligent stylist model to update at least one other window of the plurality of windows such that displayed items match both the source item and the selected depicted item.

\* \* \* \* \*

UNITED STATES PATENT AND TRADEMARK OFFICE
CERTIFICATE OF CORRECTION

PATENT NO. : 10,776,626 B1
APPLICATION NO. : 15/979064
DATED : September 15, 2020
INVENTOR(S) : Qiuying Lin et al.

Page 1 of 1

It is certified that error appears in the above-identified patent and that said Letters Patent is hereby corrected as shown below:

In the Specification

At Column 15, Line 44, after "based" insert --)--.

At Column 15, Line 45, delete "CI" and insert --$C_1$--.

In the Claims

At Column 20, Line 65, after "associated" insert --with--.

At Column 22, Line 34, after "first category" insert --of--.

At Column 24, Line 13, after "first category" insert --of--.

Signed and Sealed this
Eighth Day of December, 2020

Andrei Iancu
*Director of the United States Patent and Trademark Office*